(12) United States Patent
Kraus et al.

(10) Patent No.: US 11,750,619 B2
(45) Date of Patent: Sep. 5, 2023

(54) MODIFY ASSIGNED PRIVILEGE LEVELS AND LIMIT ACCESS TO RESOURCES

(71) Applicant: Microsoft Technology Licensing, LLC, Redmond, WA (US)

(72) Inventors: Naama Kraus, Haifa (IL); Tamer Salman, Haifa (IL); Moshe Israel, Ramat-Gan (IL); Moshe Shalala, Rishon Lezion (IL); Idan Hen, Tel Aviv (IL); Avihai Dvir, Bruchin (IL); Rotem Lurie, Tel Aviv (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 360 days.

(21) Appl. No.: 16/913,876

(22) Filed: Jun. 26, 2020

(65) Prior Publication Data

US 2021/0409419 A1    Dec. 30, 2021

(51) Int. Cl.
*H04L 9/40*    (2022.01)
(52) U.S. Cl.
CPC .......... *H04L 63/105* (2013.01); *H04L 63/102* (2013.01)
(58) Field of Classification Search
CPC ........................... H04L 63/105; H04L 63/102
See application file for complete search history.

(56) References Cited

U.S. PATENT DOCUMENTS

| | | | |
|---|---|---|---|
| 9,307,179 B1* | 4/2016 | Wyatt ................ | H04N 21/4318 |
| 10,116,679 B1* | 10/2018 | Wu ........................ | H04L 43/12 |
| 10,567,388 B1* | 2/2020 | Kruse ..................... | H04L 63/10 |
| 10,944,758 B1* | 3/2021 | Nagargadde ........ | G06F 21/6218 |
| 11,003,645 B1* | 5/2021 | Thompson ............ | G06F 16/906 |
| 11,392,707 B2* | 7/2022 | Watson ................. | G06F 21/604 |
| 2005/0097595 A1* | 5/2005 | Lipsanen .............. | H04L 65/611 |
| | | | 725/62 |
| 2005/0251675 A1* | 11/2005 | Marcjan .............. | G06F 21/6218 |
| | | | 713/100 |
| 2010/0082679 A1* | 4/2010 | Ekberg ................. | G06F 21/629 |
| | | | 707/783 |

(Continued)

FOREIGN PATENT DOCUMENTS

WO    2021045832 A1    3/2021

OTHER PUBLICATIONS

"15 Top Cloud Computing Service Provider Companies", Retrieved from: https://web.archive.org/web/20200420001827/https://www.softwaretestinghelp.com/cloud-computing-service-providers/, Apr. 20, 2020, 14 pages.

(Continued)

*Primary Examiner* — Jason Chiang
(74) *Attorney, Agent, or Firm* — Mannava & Kang, P.C.

(57) ABSTRACT

According to examples, an apparatus may include a memory on which is stored machine-readable instructions that may cause a processor to identify a privilege level assigned to a principal over a resource and determine whether the assigned privilege level is to be maintained or modified for the principal over the resource. Based on a determination that the assigned privilege level is to be maintained for the principal, the processor may determine whether access by the principal over the resource is to be limited and based on a determination that access to the resource is to be limited, apply a limited access by the principal over the resource.

20 Claims, 4 Drawing Sheets

(56) References Cited

U.S. PATENT DOCUMENTS

| | | | | |
|---|---|---|---|---|
| 2011/0307831 | A1* | 12/2011 | Cowan | G06F 9/5011 |
| | | | | 715/823 |
| 2013/0086581 | A1* | 4/2013 | Frazier | G06F 9/462 |
| | | | | 718/1 |
| 2014/0165216 | A1* | 6/2014 | Kwag | G06F 9/4843 |
| | | | | 726/30 |
| 2016/0134638 | A1* | 5/2016 | Tulshibagwale | H04L 63/105 |
| | | | | 726/4 |
| 2017/0293581 | A1* | 10/2017 | Villatel | G06F 21/78 |
| 2018/0102952 | A1* | 4/2018 | Gopalakrishnan | |
| | | | | G06F 16/9535 |
| 2020/0403996 | A1* | 12/2020 | Parimi | H04L 63/102 |
| 2020/0412726 | A1* | 12/2020 | Nevatia | G06F 21/604 |
| 2021/0075795 | A1* | 3/2021 | Liu | H04L 63/083 |
| 2021/0092124 | A1* | 3/2021 | Albero | G06N 20/00 |

OTHER PUBLICATIONS

"Moving Average", Retrieved from: https://en.wikipedia.org/wiki/Moving_average, Jun. 6, 2020, 12 Pages.

"Principle of Least Privilege", Retrieved from: https://en.wikipedia.org/wiki/Principle_of_least_privilege, Apr. 14, 2020, 5 Pages.

Kerner, Sean Michael, "Top Cloud Security Companies", Retrieved from: https://www.esecurityplanet.com/products/cloud-security-companies.html, Jan. 29, 2020, 6 Pages.

Lyon, et al., "What is Azure AD Privileged Identity Management?", Retrieved from: https://docs.microsoft.com/en-us/azure/active-directory/privileged-identity-management/pim-configure, Apr. 21, 2020, 201 Pages.

Wike, et al., "List Group Transitive Members", Retrieved from: https://docs.microsoft.com/en-us/graph/api/group-list-transitivemembers?view=graph-rest-1.0&tabs=http, May 19, 2020, 3 pages.

Wike, et al., "List Members", Retrieved from: https://docs.microsoft.com/en-us/graph/api/group-list-members?view=graph-rest-1.0&tabs=http, May 21, 2020, 3 Pages.

"International Search Report and Written Opinion Issued in PCT Application No. PCT/US21/027876", dated Jun. 14, 2021, 12 Pages.

* cited by examiner

MODIFY ASSIGNED PRIVILEGE LEVELS AND LIMIT ACCESS TO RESOURCES

BACKGROUND

Cloud providers may provide users access to a variety of resources, which may be shared among many users. In order to provide secure access, guarantee privacy, and adhere to legal and compliance regulations, cloud providers may implement access models that may allow for organizational administrators to apply restrictions on resource access. For instance, cloud providers may employ a Rule Based Access Control (RBAC) as an access model for the users over the resources.

BRIEF DESCRIPTION OF DRAWINGS

Features of the present disclosure are illustrated by way of example and not limited in the following figure(s), in which like numerals indicate like elements, in which.

DETAILED DESCRIPTION

Figure 1:
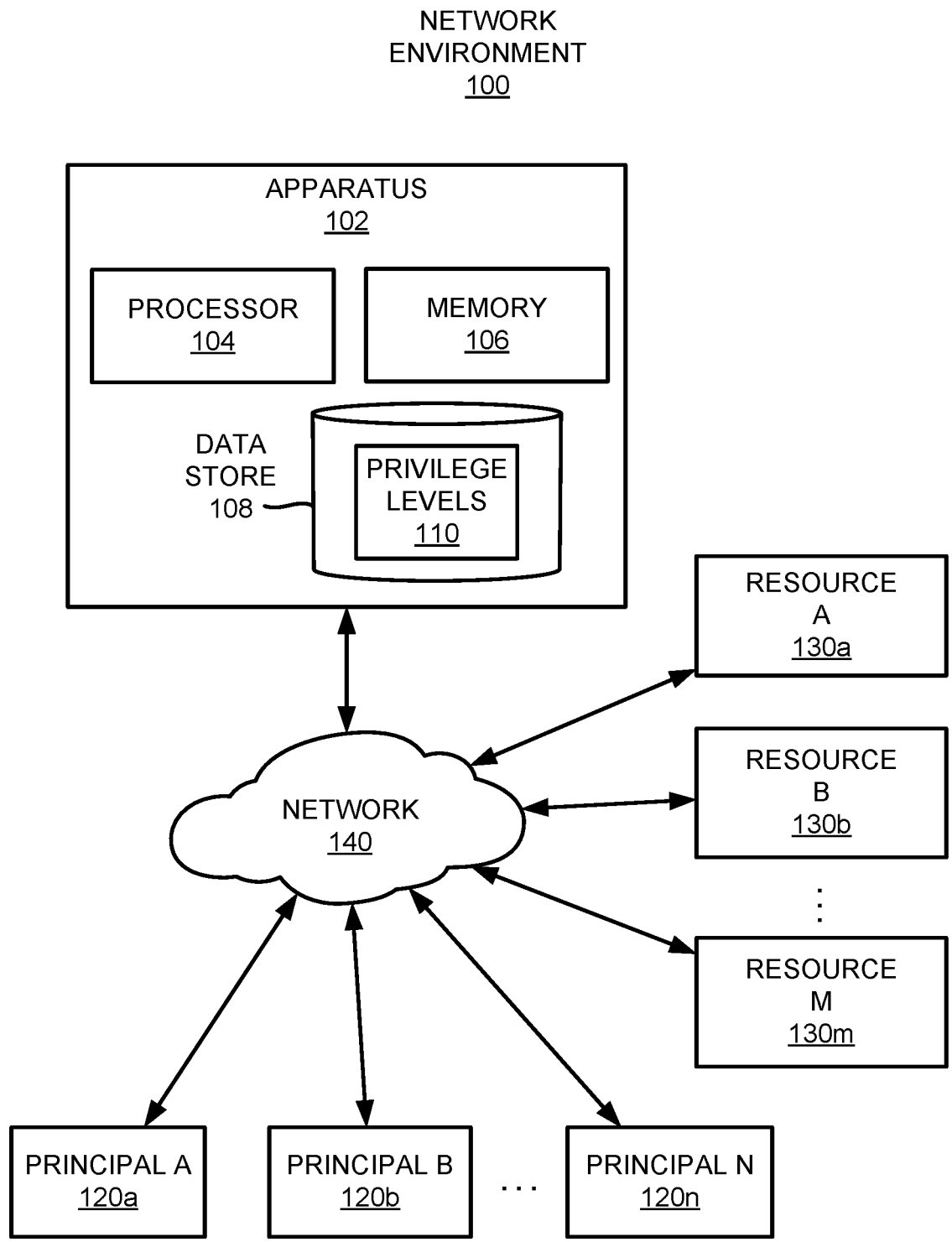
FIG. 1 shows a block diagram of a network environment, in which an apparatus may manage privilege levels assigned to principals, in accordance with an embodiment of the present disclosure.

For simplicity and illustrative purposes, the principles of the present disclosure are described by referring mainly to embodiments and examples thereof. In the following description, numerous specific details are set forth in order to provide an understanding of the embodiments and examples. It will be apparent, however, to one of ordinary skill in the art, that the embodiments and examples may be practiced without limitation to these specific details. In some instances, well known methods and/or structures have not been described in detail so as not to unnecessarily obscure the description of the embodiments and examples. Furthermore, the embodiments and examples may be used together in various combinations.

Throughout the present disclosure, the terms "a" and "an" are intended to denote at least one of a particular element. As used herein, the term "includes" means includes but not limited to, the term "including" means including but not limited to. The term "based on" means based at least in part on.

Disclosed herein are systems, apparatuses, methods, and computer-readable media in which a processor may manage assignment of privilege levels as well as access limits to principals over resources. Particularly, for instance, instead of basing decisions on whether to reduce privilege levels of a principal over a resource on usage history of the principal on the resource, the processor may make these decisions on other types of information. For instance, the processor may base these decisions on other factors such as a length of inactivity by the principal with a resource, a type of the principal, and/or the like. In addition to making decisions as to whether to reduce privilege levels, the processor may make decisions as to whether to impose limits to the access of the resource by the principal. The processor may make the access limit decisions based on a number of features including, for instance, an access frequency of the principal to the resource, an importance of the principal, an importance of the resource, a health of the resource, a role of the principal, whether the assignment of the privilege level is direct or inherited from a group, and/or the like.

In some examples, the processor may determine a modification score and/or an access limiting score for the principal based on some or all of the factors and may apply the modification score and/or the access limiting score in equations to determine whether to modify or maintain a privilege level assigned to the principal and/or whether to impose the access limit. In other examples, the processor may employ a predictive model that may determine whether to modify or maintain a privilege level assigned to the principal and/or whether to impose the access limit based on inputted data pertaining to the principal.

A technological issue with conventional management of principal privileges and access to resources may be that the principals may be provided with greater levels of privilege and access than the principals may need to normally perform their intended duties, which may expose the resources to malicious actors. Through implementation of various features of the present disclosure, a processor may determine least privilege levels that may be assigned to the principals over the resources using information in addition to usage history by the principals with the resources. As a result, decisions as to whether to downgrade the privilege levels of the principals may be made to more accurately reflect the actual requirements of the principals. In addition, the processor may determine when to apply access limits on the principals to the resources, which may reduce the potential of exposing the resources to malicious actors. As a result, a technological improvement of the features of the present disclosure may be that the principals may be assigned least privilege levels over resources, which may improve security on the resources. Likewise, the application of access limits on the principals may improve security on the resources as the limiting of the access may reduce the exposure to potential malicious actors.

Figure 2:
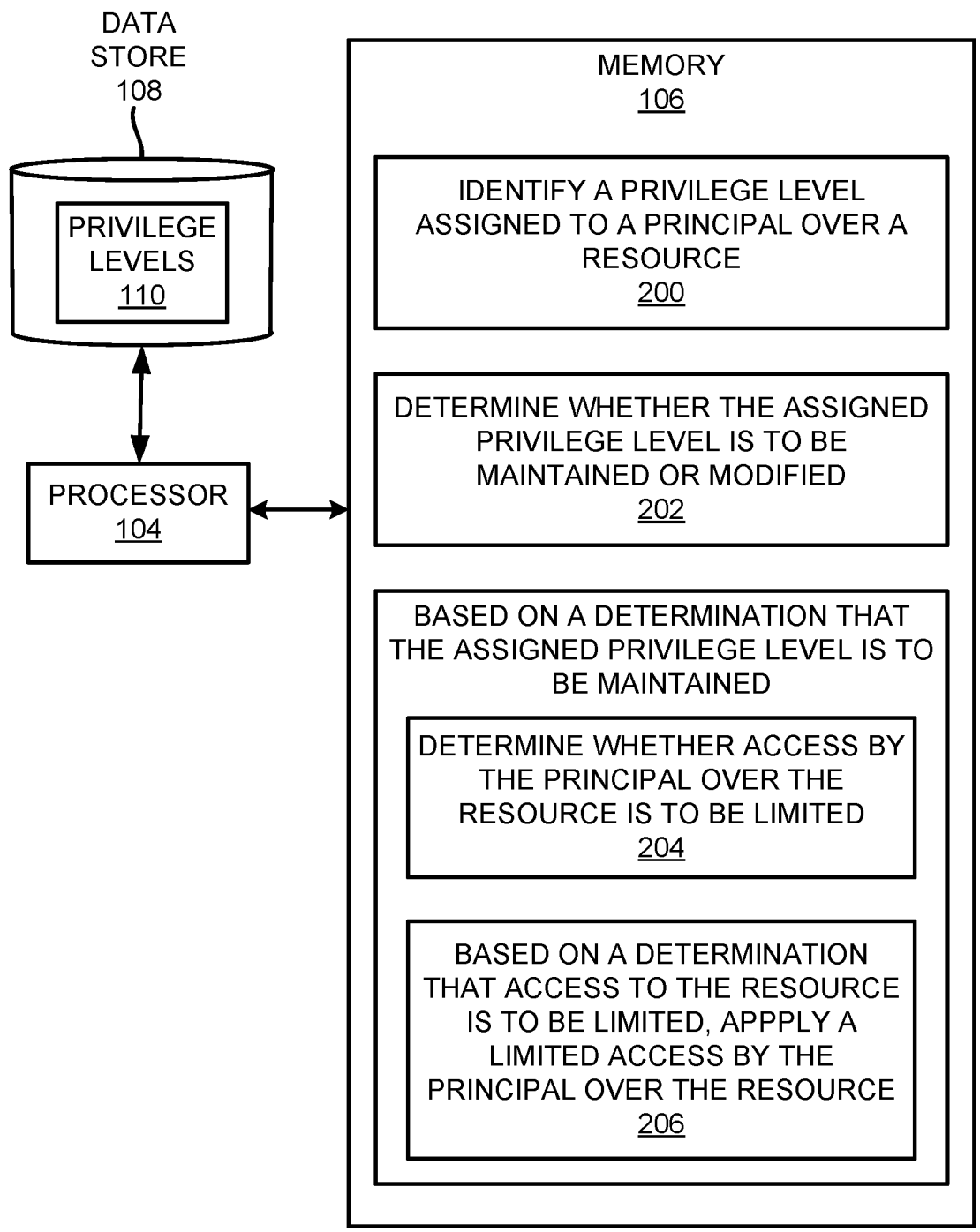
FIG. 2 depicts a block diagram of the apparatus depicted in FIG. 1, in accordance with an embodiment of the present disclosure.

Reference is first made to FIGS. 1 and 2. FIG. 1 shows a block diagram of a network environment 100, in which an apparatus 102 may manage privilege levels assigned to principals 120a-120n, in accordance with an embodiment of the present disclosure. FIG. 2 depicts a block diagram of the apparatus 102 depicted in FIG. 1, in accordance with an embodiment of the present disclosure. It should be understood that the network environment 100 and the apparatus 102 of the network environment 100 may include additional features and that some of the features described herein may be removed and/or modified without departing from the scopes of the network environment 100 and/or the apparatus 102.

As shown in FIG. 1, the network environment 100 may include the apparatus 102, a plurality of principals 120a-120n, resources 130a-130m, and a network 140. Each of the variables "n" and "m" may represent a value greater than 1. According to examples, the apparatus 102 may be a server or other type of computing device, e.g., a network gateway, an access point, or the like, that may provide administrative services to the principals 120a-120n, which is also referenced herein as entities 120a-120n. In some examples, each of the principals 120a-120n may be a different user, user account, service, application, or the like. For instance, the first principal 120a may represent a first user account that is logged into a first computing device, the second principal 122b may represent a first service executing a second computing device, etc. As such, for instance, a user may log into different computing devices using a user account at different times. Likewise, different services may execute on different computing devices and may access the resources 130a-130m during the execution of the services.

As further shown in FIG. 1, the apparatus 102 may communicate with each of the principals 120a-120n via a network 140, which may be any suitable type of network through which the principals 120a-120n, e.g., the computing devices on which the principals 120a-120n are logged in, are executing, etc., and the apparatus 102 may communicate with each other, such as the Internet, a wide area network, a local area network, and/or the like. In addition, the principals 120a-120n may communicate with the resources 130a-130m via the network 140. The resources 130a-130m may each be a server, a service, a virtual machine, a data store, and/or the like.

As discussed herein, a principal 120a may be assigned a privilege level, which may also be referenced as a permission level, a role, or the like, over a first resource 130a, a privilege level to the second resource 130b, and so forth. The privilege levels assigned to the principal 120a may be the same or may differ for two or more of the resources 130a-130m. As also discussed herein, the apparatus 102, and more particularly, the processor 104, may assign and/or modify an assigned privilege level to the principal 120a for the first resource 130a, for the second resource 130b, and so forth. The privilege level may be assigned based on a type of access that the principal 120a is to have over the first resource 130a, the second resource 130b, etc., e.g., the files, documents, data, and/or the like, stored on the resource 130a-130b. For instance, a first principal 120a may be assigned a higher privilege level to the first resource 130a than a second principal 120b because the first principal 120a may normally manipulate the data provided by the first resource 130a whereas the second principal 120b may normally read the data provided by the first resource 130a. The remaining principals 120b-120n may be assigned with privilege levels over the resources 130a-130m in similar manners.

The types of access may include, for instance, an administrator type, a writer type, a reader type, a limited reader type, a limited writer type, a no access type, and/or the like. A principal 120a that has been assigned the administrator type of access to a resource 130a may enable the principal 120a to have a highest level of access to the data associated with the resource 130a. Thus, for instance, the administrator type of access may enable the principal 120a to read, write, copy, delete, modify, etc., the data. The writer type of access may enable the principal 120a to read and write the data. The limited writer type of access may be similar to the writer type of access but may enable the principal 120a to read and write the data, but with some restrictions. The reader type of access may enable the principal 120a to read the data without being able to write, e.g., modify, the data. The limited reader type of access may be similar to the reader type of access but may enable the principal 120a to read the data, but with some restrictions.

As shown in FIG. 1, the apparatus 102 may include a data store 108 on which assigned privilege levels 110 of the principals 120a-120n may be stored. The data store 108 may be a Random Access memory (RAM), an Electrically Erasable Programmable Read-Only Memory (EEPROM), a storage device, or the like. The assigned privilege levels 110 may be applied or enforced such that, for instance, access by the principals 120a-120n to the resources 130a-130m may be restricted to their respective assigned privilege levels. For instance, the apparatus 102 may employ role-based access control over the principals 120a-120n.

According to examples, and as discussed in greater detail herein, the apparatus 102 may manage the privilege levels assigned to principals 120a-120n over the resources 130a-130m such that, for instance, the principals 120a-120n may be assigned appropriate privilege levels over the resources 130a-130m. That is, for instance, the apparatus 102 may manage the privilege levels assigned to the principals 120a-120n over the resources 130a-130m such that the principals 120a-120n may be assigned least privilege levels, e.g., minimal privilege levels, that may enable the principals 120a-120n to normally perform their intended duties. The apparatus 102 may also apply the assigned least privilege levels to the principals 120a-120n such that the principals 120a-120n may be prevented from having access (e.g., read access, write access, etc.) to the data associated with the resources 130a-130n that exceed the assigned least privilege levels. By assigning and applying the least privilege levels to the principals 120a-120n, access to the data associated with the resources 130a-130m may be better restricted, which may enhance security of the resources 130a-130m.

According to examples, and as also discussed in greater detail herein, the apparatus 102 may manage application of access limits by the principals 120a-120n over the resources 130a-130m. The access limits may include, for instance, additional restrictions that may be applied or imposed on the principals 120a-120n over the resources 130a-130m based on certain features of the principals 120a-120n and/or the resources 130a-130m. The access limits may include, for instance, time-based access limits, location-based access limits, a requirement that approval be received prior to accessing a resource, and/or the like. Although particular reference is made herein to a particular principal 120a and a particular resource 130a, it should be understood that the features discussed herein may be applicable to the remaining combinations of principals 120a-120n and resources 130a-130m.

As shown in FIGS. 1 and 2, the apparatus 102 may include a processor 104 that may control operations of the apparatus 102. The apparatus 102 may also include a memory 106 on which data that the processor 104 may access and/or may execute may be stored. The processor 104 may be a semiconductor-based microprocessor, a central processing unit (CPU), an application specific integrated circuit (ASIC), a field-programmable gate array (FPGA), and/or other hardware device. The memory 106, which may also be termed a computer readable medium, may be, for example, a Random Access memory (RAM), an Electrically Erasable Programmable Read-Only Memory (EEPROM), a storage device, or the like. The memory 106 may be a non-transitory computer readable storage medium, where the term "non-transitory" does not encompass transitory propagating signals. In any regard, the memory 106 may have stored thereon machine-readable instructions that the processor 104 may execute.

Although the apparatus 102 is depicted as having a single processor 104, it should be understood that the apparatus 102 may include additional processors and/or cores without departing from a scope of the apparatus 102. In this regard, references to a single processor 104 as well as to a single memory 106 may be understood to additionally or alternatively pertain to multiple processors 104 and multiple memories 106. In addition, or alternatively, the processor 104 and the memory 106 may be integrated into a single component, e.g., an integrated circuit on which both the processor 104 and the memory 106 may be provided. In addition, or alternatively, the operations described herein as being performed by the processor 104 may be distributed across multiple apparatuses 102 and/or multiple processors 104.

As shown in FIG. 2, the memory 106 may have stored thereon machine-readable instructions 200-206 that the processor 104 may execute. Although the instructions 200-206 are described herein as being stored on the memory 106 and may thus include a set of machine-readable instructions, the apparatus 102 may include hardware logic blocks that may perform functions similar to the instructions 200-206. For instance, the processor 104 may include hardware components that may execute the instructions 200-206. In other examples, the apparatus 102 may include a combination of instructions and hardware logic blocks to implement or execute functions corresponding to the instructions 200-206. In any of these examples, the processor 104 may implement the hardware logic blocks and/or execute the instructions 200-206. As discussed herein, the apparatus 102 may also include additional instructions and/or hardware logic blocks such that the processor 104 may execute operations in addition to or in place of those discussed above with respect to FIG. 2.

The processor 104 may execute the instructions 200 to identify a privilege level assigned to a principal 120a over a resource 130a. The processor 104 may identify the privilege level assigned to the principal 120a over the resource 130a from the assigned privilege levels 110 stored in the data store 108. In some instances, an administrator may have assigned the privilege level to the principal 120a over the resource 130a while in other instances, the processor 104 may have assigned the privilege level.

The processor 104 may execute the instructions 202 to determine whether the assigned privilege level is to be maintained or modified for the principal 120a over the resource 130a. The processor 104 may make this determination based on any of a number of features associated with the principal 120a and, in some instances, the resource 130a. The features may include, for instance, a usage history of the resource 130a by the principal 120a, a length of inactivity by the principal 120a with the resource 130a, a type of the principal 120a, an importance of the principal 120a, the health of the resource 130a, a role of the principal 120a, whether the privilege level assignment is directly made or is inherited from a privilege level assigned to group to which the principal 120a is a member, and/or the like.

In some examples, the processor 104 may determine, for the principal 120a, a least privilege level to the resource 130a. That is, for instance, the processor 104 may determine, for the principal 120a, a least or lowest privilege level that the principal 120a may need to perform the principal's 120a normal duties or functions. By way of example, the processor 104 may determine that the principal 120a may normally read data associated with, e.g., stored by, under the control of, or the like, the resource 130a. Thus, for instance, the processor 104 may determine that the least privilege level that the principal 120a may need for the resource 130a is a read type of privilege level.

The processor 104 may determine the least privilege level for the resource 130a through implementation of any suitable algorithm or technique. For instance, the processor 104 may determine historical usage of the resource 130a by the principal 120a, e.g., the type of access that the principal 120a used on the resource 130a. The processor 104 may review logs or other data that may show the historical usage over a certain period of time, e.g., the past month, the past three months, and/or the like, etc. By way of example, the processor 104 may determine that the least privilege level for the principal 120a may be a read privilege level based on a determination that the principal 120a did not perform any write operations of the data associated with the resource 130a during the time period at which the historical usage was analyzed.

The processor 104 may additionally or alternatively determine whether to maintain or modify the privilege level assigned to the principal 120a over the resource 130a based on other factors. In these examples, the processor 104 may access the other factors from, for instance, logs or other suitable sources of information. In some examples, the processor 104 may determine a length of inactivity by the principal 120a with the resource 130. In these examples, the processor 104 may determine whether the assigned privilege level is to be maintained or modified for the principal 120a over the resource 130a based on the determined length of inactivity by the principal 120a with the resource 130a. That is, for instance, the processor 104 may determine that the assigned privilege level is to be maintained based on the determined length of inactivity falling below a predefined modification threshold. Likewise, the processor 104 may determine that the assigned privilege level is to be modified based on the determined length of inactivity exceeding the predefined modification threshold. The predefined modification threshold may be user-defined and may be based on a type of the principal 120a as discussed in greater detail herein.

The processor 104 may also determine other features of the principal 120a and/or features of the resource 130a, such as a type of the principal 120a, which may be, for instance, a user, user account, service, application, or the like. The other features of the principal 120a may also or alternatively include an importance of the principal 120a, the health of the resource 130a, a role of the principal 120a, whether the privilege level assignment is directly made or is inherited from a privilege level assigned to group to which the principal 120a is a member, and/or the like. The processor 104 may also determine whether the assigned privilege level is to be maintained or modified based on the determined feature or features of the principal 120a and/or the resource 130a. That is, for instance, the processor 104 may determine whether the assigned privilege level is to be maintained or modified based on both the determined length of inactivity of the principal 120a with the resource 130a and a determined feature of the principal 120a and/or the resource 130a. In some examples, the processor 104 may base the predefined modification threshold on the determined type of the principal 120a. That is, for instance, the predefined modification threshold may differ for different types of principals 120a. By way of example, the proposed modification threshold, e.g., the inactivity length at which the processor 104 determines that the assigned privilege level is to be modified may be lower for applications or services than for users.

According to examples, the processor 104 may determine whether to modify the privilege level assigned to the principal 120a over the resource 130a based on a modification score. In these examples, the processor 104 may determine a modification score based on a number of factors and may compare the modification score to a predefined modification threshold. In addition, based on the modification score exceeding the predefined modification threshold, the processor 104 may determine that the privilege level assigned to the principal 120*a* is to be modified. The processor 104 may also modify the privilege level assigned to the principal 120*a* over the resource 130*a*, e.g., by assigning a lower privilege level to the principal 120*a* over the resource 130*a*. The processor 104 may further store the assigned lower privilege level in the data store 108 with the privilege levels 110.

By way of particular example, the processor 104 may determine a modification score based on the determined length of inactivity and the determined feature of the principal 120*a* and/or the resource 130*a*. In this example, an inactivity score, e.g., between 0 and 1, may be determined based on the length of inactivity by the principal 120*a* with the resource 130*a*. The inactivity score may correspond to the length of inactivity such that, for instance, the inactivity score may be higher for a longer inactivity length than for a shorter inactivity length. In addition, a weight may be determined based on a feature of the principal 120*a*, such as the type of the principal 120*a*, the importance of the principle 120*a*, or the like. Thus, for instance, a first type of principal (e.g., a user) may have a first principal type weight (e.g., 0.7, 0.8, or the like) and a second type of principal (e.g., a service) may have a second principal type weight (e.g., 0.9, 1, or the like).

In the example above, the modification score for the principal 120*a* over the resource 130*a* may be determined as follows:

modification score=inactivity score*weight.

Thus, in an example in which the principal 120*a* was not active with the resource 130*a* for a relatively long time, e.g., has an inactivity score of 0.8, and the principal 120*a* is a user, the modification score would be (0.8)*(0.8), which is 0.64. However, if under the same scenario the principal 120*a* is a service, the modification score would be (0.8)*(1), which is 0.8. In this scenario, a user may be permitted a longer inactivity time than a service prior to the modification score indicating that a modification is to be made. In any regard, the processor 104 may determine whether the modification score exceeds a predefined modification threshold, which may be user-defined, based on prior modification scores, based on testing, and/or the like. In addition, based on a determination that the modification score exceeds the predefined modification threshold, the processor 104 may modify the privilege level assigned to the principal 120*a* over the resource 130*a*.

The processor 104 may, based on a determination that the assigned privilege level is to be modified, modify the assigned privilege level. That is, for instance, the processor 104 may assign a lower privilege level to the principal 120*a* to the resource 130*a* and may store the assigned lower privilege level in the data store 108 with the privilege levels 110. However, based on a determination that the assigned privilege level is to be maintained, the processor 104 may execute the instructions 204 to determine whether access by the principal 120*a* over the resource 130*a* is to be limited.

The processor 104 may determine whether access by the principal 120*a* over the resource 130*a* is to be limited based on a number of other factors. In these examples, the processor 104 may access the factors from, for instance, logs, an administrator, and/or other suitable sources of information. The factors may include an access frequency of the principal 120*a* to the resource 130*a* over a predetermined time period, an importance of the principal 120*a*, a role of the principal 120*a* in an organization, a volume of resources 130*a*-130*m* that the principal 120*a* may access, a sensitivity of the resource 130*a*, and/or the like. For instance, the processor 104 may determine whether access by the principal 120*a* to the resource 130*a* is to be limited based on the determined access frequency of the principal 120*a* to the resource 130*b* over the predetermined time period falling below a predefined access threshold, which may be user-defined, based on testing, based on modeling, and/or the like. By way of example, the access frequency may be, for instance, that the principal 120*a* accessed the resource 130*b* eighty times out of the last 100 days, and the processor 104 may determine that access by the principal 120*a* to the resource 130*a* is not to be limited as the determined access frequency may exceed the predefined access threshold.

In some examples, the processor 104 may determine other features associated with the principal 120*a* and/or the resource 130*a*. The other features may include, for instance, an importance of the principal 120*a*, the health of the resource 130*a*, a role of the principal 120*a*, whether the privilege level assignment is directly made or is inherited from a privilege level assigned to group to which the principal 120*a* is a member, and/or the like. The importance of the principal 120*a*, for instance, may be based on various features, such as a role of the principal 120*a* in an organization, a volume of resources 130*a*-130*m* that the principal 120*a* may access, a sensitivity of the resource 130*a*, and/or the like. In other examples, an administrator or other individual may define the importance of the principal 120*a* for an organization and the processor 104 may determine the defined importance of the principal 120*a*. In any regard, the processor 104 may determine whether access by the principal 120*a* over the resource 130*a* is to be limited also based on the determined feature or features of the principal 120*a* and/or the resource 130*a*. In some examples, the processor 104 may determine that access by the principal 120*a* over the resource 130*a* is to be limited based on the principal 120*a* being determined to have at least a predefined level of importance. That is, for instance, the processor 104 may limit access by a more important principal 120*a* to the resource 130*a* than a less important principal 120*a*.

Based on a determination that access by the principal 120*a* to the resource 130*a* is not to be limited, the processor 104 may maintain normal access by the principal 120*a* to the resource 130*a*. That is, the processor 104 may not further limit access by the principal 120*a* to the resource 130*a* other than the restrictions imposed by the assigned privilege level. However, based on a determination that access by the principal 120*a* to the resource 130*a* is to be limited, the processor 104 may execute the instructions 206 to apply a limited access by the principal 120*a* over the resource 130*a*. The limited access may include a time-based limit, such as, access may be limited to certain times of a day, certain days of a week, certain duration of time, and/or the like. In addition or alternatively, the limited access may include a requirement for approval prior to access of the resource 130*a*, for instance, from a manager, an administrator, or the like. As a further alternative, the limited access may include a location-based limit, such as, access may be limited to instances in which the principal 120*a* is at a certain location, e.g., the principal 120*a* may have access to the resource 130*a* while the principal 120*a* is at the principal's 120*a* office, but may not have access while the principal 120*a* is outside of the principal's 120*a* office.

According to examples, the processor 104 may determine whether to limit access by the principal 120*a* to the resource 130*a* based on an access limiting score. In these examples, the processor 104 may determine an access limiting score based on a number of factors and may compare the access limiting score to a predefined access threshold. In addition, based on the access limiting score exceeding the predefined access threshold, the processor 104 may determine that access by the principal 120*a* to the resource 130*a* is to be limited. The processor 104 may also apply the limited access to the principal 120*a* over the resource 130*a*.

By way of particular example, the processor 104 may determine an access limiting score based on the determined access frequency of the principal over the predetermined time period and the determined feature(s) of the principal 120*a* and/or the resource 130*a*. In this example, an access frequency score, which may be between 0 and 1, may be determined based on the access frequency of the principal 120*a* to the resource 130*a*. The access limiting score, which may also be between 0 and 1, may correspond to the access frequency such that, for instance, the access frequency score may be lower for greater access frequencies than for shorter access frequencies. That is, the more often the principal 120*a* accessed the resource 130*a* during the predetermined time period, the lower the access frequency score. In addition, a weight may be determined based on the determined feature(s) of the principal 120*a* and/or the resources 130*a*, in which, for instance, the weight may be higher for higher importance levels and lower for lower importance levels.

In the example above, the access limiting score for the principal 120*a* over the resource 130*a* may be determined as follows:

access limiting score=access frequency score*weight.

Thus, in an example in which the principal 120*a* did not access the resource 130*a* often during the predetermined time period, e.g., has an access frequency score of 0.7, and the principal 120*a* has a high importance, e.g., has an importance weight of 0.9, the access limiting score would be (0.7)*(0.9), which is 0.63. The processor 104 may also determine whether the access limiting score exceeds a predefined access threshold, which may be user-defined, based on prior modification scores, based on testing, and/or the like. In addition, based on a determination that the access limiting score exceeds the predefined access threshold, the processor 104 may limit access by the principal 120*a* to the resource 130*a*.

In other examples, the processor 104 may generate a predictive model using a training set of data that includes features pertaining to principals 120*a*-120*n* and resources 130*a*-130*m* and outputs corresponding to multiple combinations of the features. The features pertaining to the principals 120*a*-120*n* and the resources 130*a*-130*m* may be any of the features discussed herein. In addition, the processor 104 may implement any suitable predictive model generation technique to generate the predictive model, such as, for instance, a supervised learning algorithm, a recurrent neural network algorithm, a reinforcement learning algorithm, and/or the like.

In addition, the processor 104 may input data pertaining to the principal 120*a* into the predictive model and may apply the predictive model on the input data to predict an output for the principal 120*a*, in which the output may identify whether the assigned privilege level is to be maintained or modified for the principal 120*a* and whether access by the principal 120*a* to the resource 130*a* is to be limited. The input data may include, for instance, the type of principal 120*a*, the importance of the principal 120*a*, the length of inactivity, the access frequency, and/or the like.

In any regard, the processor 104 may store the privilege level of the principal 120*a* over the resource 130*a* as well as access limitations in the data store 108. In addition, the processor 104 may apply the assigned privilege level and the access limitations to the principal 120*a* over the resource 130*a*. That is, for instance, the processor 104 may control or otherwise cause the level and/or type of access that the principal 120*a* may have over the resource 130*a* to be restricted to the applied permission level and may also limit access by the principal 120*a* over the resource 130*a*. By way of example, the processor 104 may directly control how the principal 120*a* may access and/or manipulate data associated with the resource 130A. As another example, the processor 104 may direct or otherwise cause the resource 130*a* to enforce the level and/or type of access that the principal 120*a* may have over the resource 130*a*.

Figure 3:
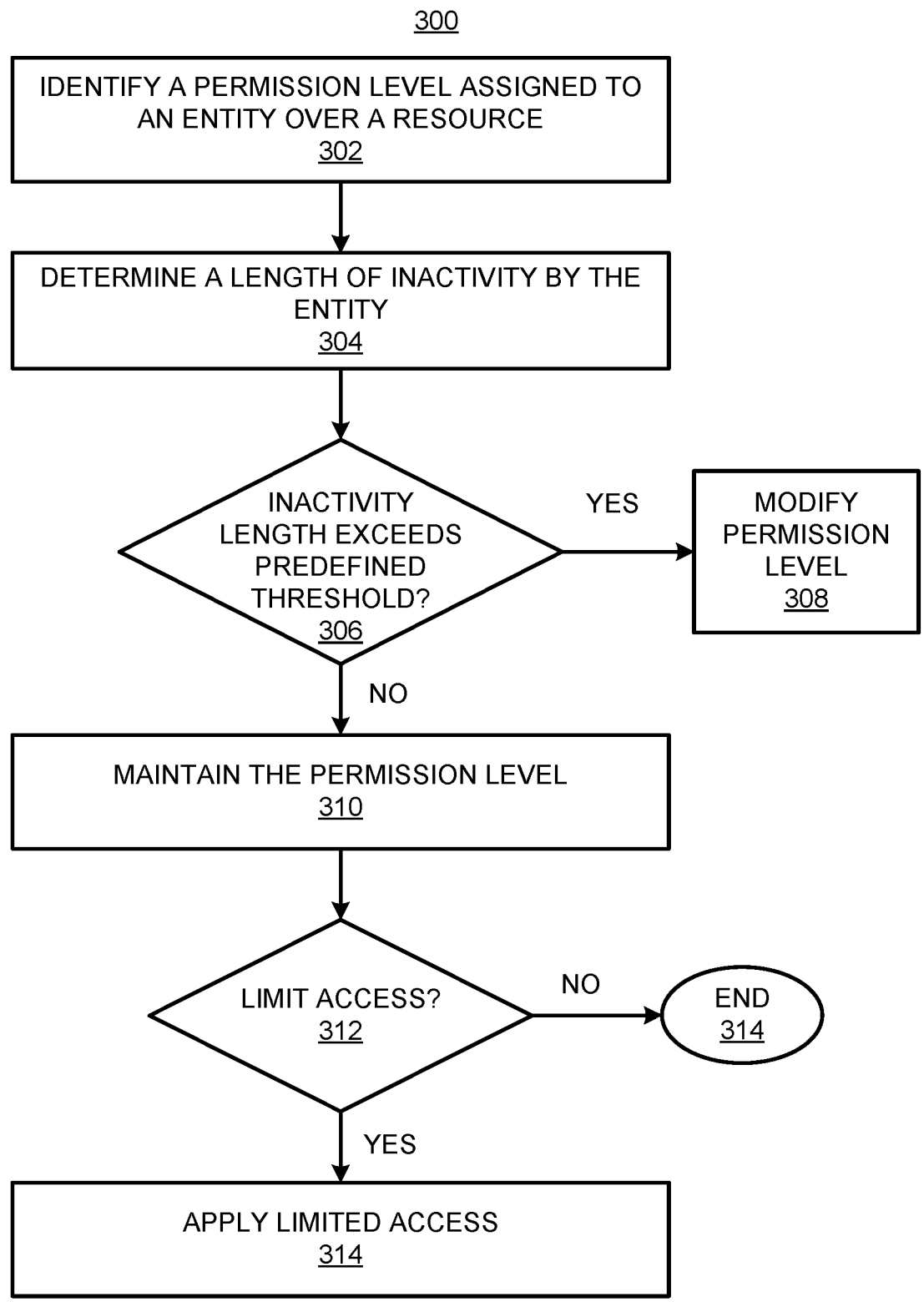
FIG. 3 depicts a flow diagram of a method for managing permission levels assigned to an entity and application of access limitations to the entity, in accordance with an embodiment of the present disclosure.

Various manners in which the processor 104 of the apparatus 102 may operate are discussed in greater detail with respect to the method 300 depicted in FIG. 3. Particularly, FIG. 3 depicts a flow diagram of a method 300 for managing permission levels assigned to an entity 120*a* and application of access limitations to the entity 120*a*, in accordance with an embodiment of the present disclosure. It should be understood that the method 300 may include additional operations and that some of the operations described therein may be removed and/or modified without departing from the scope of the method 300. The description of the method 300 is made with reference to the features depicted in FIGS. 1 and 2 for purposes of illustration.

At block 302, the processor 104 may identify a permission level assigned to an entity 120*a* (which may be equivalent to the principal 120*a*) over a resource 130*a*. The permission level may be equivalent to the privilege level discussed elsewhere herein as well as to a role or other equivalent term.

At block 304, the processor 104 may determine a length of inactivity by the entity 120*a* with the resource 130*a*. The processor 104 may determine the length of inactivity as discussed herein. At block 306, the processor 104 may determine whether the length of inactivity exceeds a predefined threshold. Based on the length of inactivity exceeding the predefined threshold, the processor 104 may modify the permission level assigned to the entity 120*a* over the resource 130*a*. That is, the processor 104 may reduce the permission level assigned to the entity 120*a* over the resource 130*a* because the entity 120*a* may not have had any activity with the resource 130*a* for at least a predefined length of time.

According to examples, the processor 104 may determine a type of the entity 120*a*, e.g., whether the entity 120*a* is a user, an application, a service, or the like. In these examples, the predefined threshold with which the determined length of activity may be compared may vary depending upon the type of entity 120*a* as discussed herein.

However, based on the determined length of inactivity by the entity 120*a* falling below the predefined threshold, at block 310, the processor 104 may determine that the permission level assigned to the entity 120*a* over the resource 130*a* is to be maintained. That is, the processor 104 may determine that the entity 120*a* interacted with the resource 130*a* within the predefined threshold time period and may determine that the permission level is to be maintained. In addition, at block 312, based on the determination that the permission level assigned to the entity 120*a* over the resource 130*a* is to be maintained, the processor 104 may determine whether access by the entity 120*a* to the resource 130*a* is to be limited. Based on a determination that access by the entity 120a to the resource 130a is not to be limited, the method 300 may end as indicated at block 314.

However, based on a determination that access by the entity 120a to the resource 130a is to be limited, the processor 104 may apply a limited access by the entity 120a over the resource 130a. The processor 104 may apply the limited access by applying a time-based limitation, a location-based limitation, an approval requirement, and/or the like, to the access as discussed herein. As also discussed herein, the processor 104 may determine an access frequency of the entity 120a to the resource 130a over a predetermined time period. In some examples, the processor 104 may also determine an importance of the entity 120a. In any of these examples, the processor 104 may determine whether access by the entity 120a to the resource 130a is to be limited based on the determined access frequency of the entity 120a to the resource 130a over the predetermined time period and/or the determined importance of the entity 120a.

In some examples, the processor 104 may determine a modification score and may determine whether to maintain or modify the permission level assigned to the entity 120a over the resource 130a based on a comparison of the modification score to a predefined modification threshold. In addition, the processor 104 may determine an access limiting score and may determine whether to limit access by the entity 120a to the resource 130a based on a comparison of the access limiting score to a predefined access threshold. However, in other examples, the processor 104 may generate a predictive model that the processor 104 may implement to predict an output that identifies whether the assigned privilege level is to be maintained or modified for the entity 120a over the resource 130a and whether access by the entity 120a to the resource 130a is to be limited.

Some or all of the operations set forth in the method 300 may be included as utilities, programs, or subprograms, in any desired computer accessible medium. In addition, the method 300 may be embodied by computer programs, which may exist in a variety of forms both active and inactive. For example, they may exist as machine-readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Figure 4:
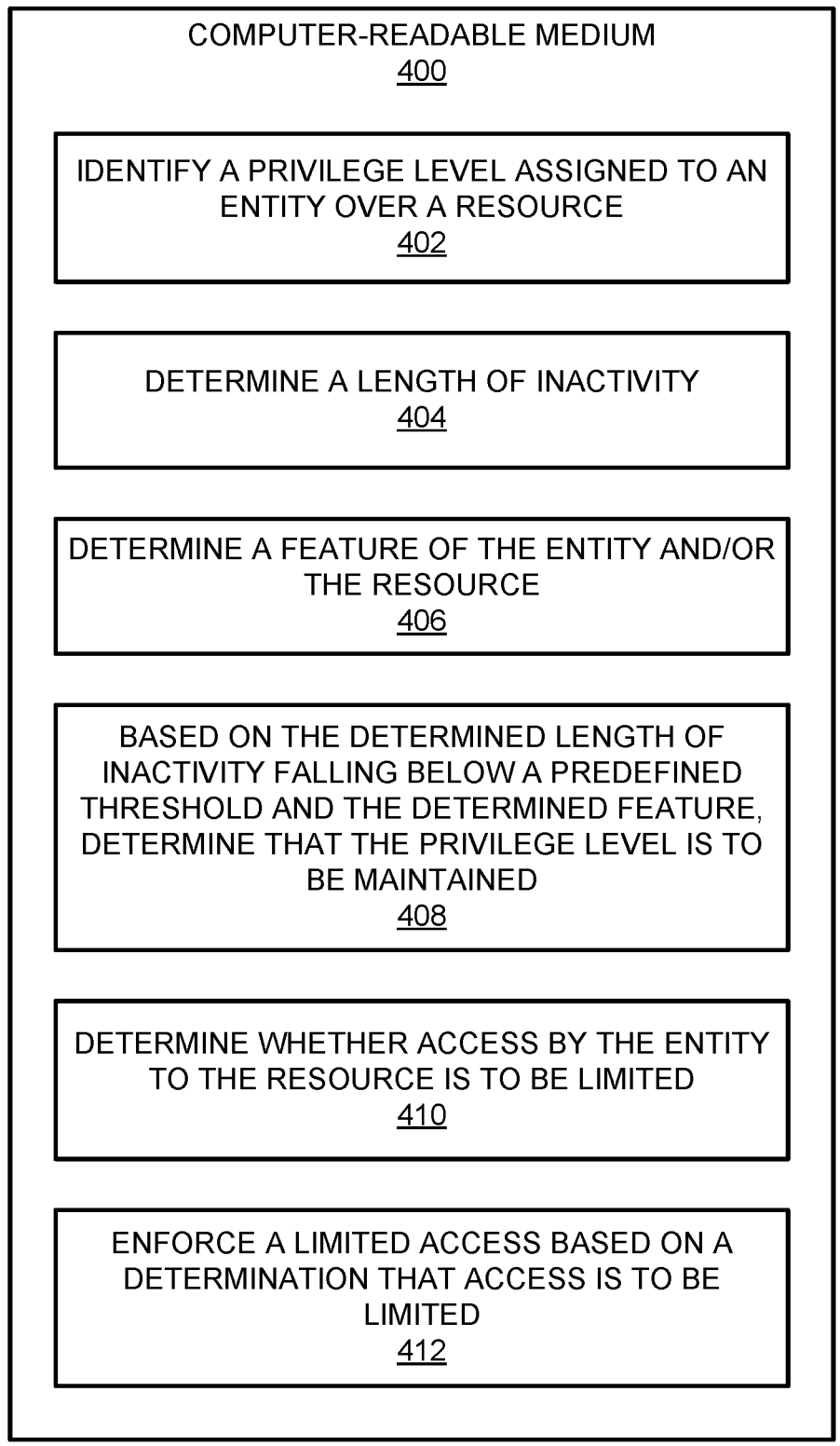
FIG. 4 depicts a block diagram of a computer-readable medium that may have stored thereon computer-readable instructions for modifying a privilege level assigned to an entity over a resource and enforcing an access limitation on the entity to the resource, in accordance with an embodiment of the present disclosure.

Turning now to FIG. 4, there is shown a block diagram of a computer-readable medium 400 that may have stored thereon computer-readable instructions for modifying a privilege level assigned to an entity 120a over a resource 130a and enforcing an access limitation on the entity 120a to the resource 130a, in accordance with an embodiment of the present disclosure. It should be understood that the computer-readable medium 400 depicted in FIG. 4 may include additional instructions and that some of the instructions described herein may be removed and/or modified without departing from the scope of the computer-readable medium 400 disclosed herein. The computer-readable medium 400 may be a non-transitory computer-readable medium, in which the term "non-transitory" does not encompass transitory propagating signals.

The computer-readable medium 400 may have stored thereon computer-readable instructions 402-412 that a processor, such as the processor 104 depicted in FIGS. 1 and 2, may execute. The computer-readable medium 400 may be an electronic, magnetic, optical, or other physical storage device that contains or stores executable instructions. The computer-readable medium 400 may be, for example, Random Access memory (RAM), an Electrically Erasable Programmable Read-Only Memory (EEPROM), a storage device, an optical disc, and the like.

The processor may fetch, decode, and execute the instructions 402 to identify a privilege level assigned to an entity 120a over a resource 130a. The processor may fetch, decode, and execute the instructions 404 to determine a length of inactivity by the entity 120a with the resource 130a. The processor may fetch, decode, and execute the instructions 406 to determine a feature of the entity 120a and/or the resource 130a. The processor may fetch, decode, and execute the instructions 408 to, based on the determined length of inactivity by the entity 120a exceeding a predefined threshold that is based on the type of the entity 120a, determine that the privilege level assigned to the entity 120a over the resource 130a is to be maintained. However, based on the determined length of inactivity by the entity 120a falling below the predefined threshold, the processor may maintain the privilege level assigned to the entity 120a. As discussed herein, the processor may determine whether the privilege level assigned to the entity 120a over the resource 130a is to be maintained using a determined modification score.

The processor may fetch, decode, and execute the instructions 410 to, based on the determination that the privilege level assigned to the entity 120a over the resource 130a is to be maintained, determine whether access by the entity 120a to the resource 130a is to be limited. The processor may make this determination based on an access frequency of the entity 120a to the resource 130a over a predetermined time period and/or based on a determined feature of the entity 120a and/or the resource 130a. As discussed herein, the processor may determine whether access is to be limited using a determined access limiting score, for instance, based on the determined access limiting score exceeding a predefined access threshold. In addition, the processor may determine whether access is to be limited based on whether the determined access limiting score exceeds the predefined access threshold and whether the determined feature of the entity 120a and/or the resource 130a warrants the access being limited as discussed herein. The processor may fetch, decode, and execute the instructions 412 to enforce a limited access by the entity 120a over the resource 130a based on a determination that access by the entity 120a to the resource 130a is to be limited.

Although described specifically throughout the entirety of the instant disclosure, representative examples of the present disclosure have utility over a \wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. An apparatus comprising:
   a processor; and
   a memory on which is stored machine-readable instructions that cause the processor to:
   identify a privilege level assigned to a principal over a resource;
   determine a length of inactivity by the principal with the resource;
   determine a weight of the principal based on a type of the principal, wherein the type of the principal indicates an importance level of the principal in an organization;
   determine a modification score based on the determined length of inactivity by the principal scaled by the weight of the principal;
   determine whether the modification score exceeds a predefined modification threshold score; and
   based on a determination that the modification score exceeds the predefined modification threshold score, modify the privilege level assigned to the principal over the resource.

2. The apparatus of claim 1, wherein the instructions cause the processor to:
   based on a determination that the modification score does not exceed the predefined modification threshold score, determine that the assigned privilege level is to be maintained for the principal.

3. The apparatus of claim 2, wherein the instructions cause the processor to:
   based on the determination that the assigned privilege level is to be maintained for the principal, determine whether access by the principal over the resource is to be limited; and
   based on a determination that the access by the principal over the resource is to be limited, apply a limited access by the principal over the resource.

4. The apparatus of claim 1, wherein the instructions cause the processor to:
   determine a property of the resource; and
   determine the modification score also based on the determined property of the resource.

5. The apparatus of claim 1, wherein the instructions cause the processor to:
   determine an access frequency of the principal to the resource over a predetermined time period; and
   determine whether access by the principal to the resource is to be limited based on the determined access frequency of the principal to the resource over the predetermined time period.

6. The apparatus of claim 5, wherein the instructions cause the processor to:
   determine a property of the resource; and
   determine whether the access by the principal over the resource is to be limited also based on the determined property of the resource.

7. The apparatus of claim 6, wherein the instructions cause the processor to:
   determine an access limiting score based on the determined access frequency of the principal to the resource over the predetermined time period and the determined property of the resource;
   determine whether the access limiting score exceeds a predefined access threshold; and
   based on a determination that the access limiting score exceeds the predefined access threshold, apply a limited access by the principal over the resource.

8. The apparatus of claim 1, wherein the instructions cause the processor to:
   generate a predictive model using a training set of data that includes features pertaining to principals and resources and outputs corresponding to multiple combinations of the features;
   input data pertaining to the principal and the resource into the predictive model; and
   apply the predictive model on the input data to predict an output for the principal, wherein the output identifies whether the assigned privilege level is to be maintained or modified for the principal and whether access by the principal to the resource is to be limited.

9. The apparatus of claim 8, wherein the input data pertaining to the principal and the resource comprises usage history of the resource by the principal, the type of the principal, a type of the resource, or a health of the resource.

10. A method comprising:
    identifying, by a processor, a permission level assigned to an entity over a resource;
    determining, by the processor, a length of inactivity by the entity with the resource;
    determining, by the processor, a weight of the entity based on a type of the entity, wherein the type of the entity indicates an importance level of the entity in an organization;
    determining, by the processor, a modification score based on the determined length of inactivity by the entity scaled by the weight of the entity;
    determining, by the processor, whether the modification score exceeds a predefined modification threshold score; and
    based on a determination that the modification score exceeds the predefined modification threshold score, modifying, by the processor, the permission level assigned to the entity over the resource.

11. The method of claim 10, further comprising:
    determining a property of the resource; and
    determining the modification score also based on the determined property of the resource.

12. The method of claim 11, further comprising:
    based on a determination that the modification score does not exceed the predefined modification threshold score, determine that the assigned permission level is to be maintained for the entity;
    based on the determination that the assigned permission level is to be maintained for the entity, determine whether access by the entity over the resource is to be limited; and
    based on a determination that the access by the entity over the resource is to be limited, apply a limited access by the entity over the resource.

13. The method of claim 10, further comprising:
    determining an access frequency of the entity to the resource over a predetermined time period; and
    determining whether access by the entity to the resource is to be limited based on the determined access frequency of the entity to the resource over the predetermined time period.

14. The method of claim 13, further comprising:
    determining a plurality of features associated with the entity or the resource; and
    determining whether access by the entity over the resource is to be limited also based on the determined plurality of features associated with the entity or the resource.

15. The method of claim 14, further comprising:
determining an access limiting score based on the determined access frequency of the entity to the resource over the predetermined time period and the determined plurality of features associated with the entity or the resource;
determining whether the access limiting score exceeds a predefined access threshold; and
based on a determination that the access limiting score exceeds the predefined access threshold, determining that the access by the entity over the resource is to be limited.

16. The method of claim 10, further comprising:
generating a predictive model using a training set of data that includes features pertaining to entities and resources and outputs corresponding to multiple combinations of the features;
inputting data pertaining to the entity and the resource into the predictive model; and
applying the predictive model on the input data to predict an output for the entity, wherein the output identifies whether the assigned permission level is to be maintained or modified for the entity over the resource and whether access by the entity to the resource is to be limited.

17. A non-transitory computer-readable medium on which is stored computer-readable instructions that when executed by a processor, cause the processor to:
identify a privilege level assigned to an entity over a resource;
determine a length of inactivity by the entity with the resource;
determine a weight of the entity based on a type of the entity, wherein the type of the entity indicates an importance level of the entity in an organization;
determine a modification score based on the determined length of inactivity by the entity scaled by the weight of the entity;
determine whether the modification score exceeds a predefined modification threshold score; and
based on a determination that the modification score exceeds the predefined modification threshold score, modifying the privilege level assigned to the entity over the resource.

18. The non-transitory computer-readable medium of claim 17, wherein the instructions further cause the processor to:
determine an access frequency of the entity to the resource over a predetermined time period; and
determine whether access by the entity to the resource is to be limited based on the determined access frequency of the entity to the resource over the predetermined time period.

19. The non-transitory computer-readable medium of claim 18, wherein the instructions further cause the processor to:
determine a plurality of other features associated with the entity and the resource; and
determine whether the access by the entity over the resource is to be limited also based on the determined plurality of other features of the entity and the resource.

20. The non-transitory computer-readable medium of claim 17, wherein the instructions further cause the processor to:
based on a determination that the modification score does not exceed the predefined modification threshold score, determine that the privilege level assigned to the entity over the resource is to be maintained;
based on the determination that the assigned privilege level is to be maintained for the entity, determine an access limiting score based on access frequency of the entity to the resource over a predetermined period of time; and
determine whether access by the entity over the resource is to be limited based on the determined access limiting score.

* * * * *